United States Patent [19]

Kanzaki et al.

[11] Patent Number: 5,458,958

[45] Date of Patent: Oct. 17, 1995

[54] SPEAKER CONE AND PROCESS FOR PRODUCTION THEREOF

[75] Inventors: Hidetoshi Kanzaki, Funabashi; Naoki Kanamori, Fuji; Noboru Saiga, Ayauta, all of Japan

[73] Assignee: Asahi Kasei Kogyo Kabushiki Kaisha, Japan

[21] Appl. No.: 139,010

[22] Filed: Oct. 21, 1993

[30] Foreign Application Priority Data

Oct. 22, 1992 [JP] Japan ..................... 4-308155

[51] Int. Cl.⁶ ............... B32B 7/00; B32B 5/22; D03D 9/00
[52] U.S. Cl. ............ 428/284; 428/285; 428/299; 428/298; 428/903; 428/902; 428/286; 428/288; 428/296; 428/310.5; 428/311.1; 428/311.5; 428/314.2; 428/317.9
[58] Field of Search ................. 428/247, 255, 428/284, 297, 298, 903

[56] References Cited

FOREIGN PATENT DOCUMENTS

| 47230/89 | 7/1990 | Australia . |
| 0376625 | 7/1990 | European Pat. Off. . |
| 57-196694 | 12/1982 | Japan . |
| 2-175915 | 7/1990 | Japan . |
| 2-200857 | 8/1990 | Japan . |
| 3154600 | 7/1991 | Japan . |

OTHER PUBLICATIONS

Arakawa, Diaphragm for Speaker, Patent Abstracts of Japan, Abstract vol. 007045, Feb. 23, 1983.
Kanzaki et al., Acrylic Nonwoven Fabric and Production Thereof, Patent Abstracts of Japan, Abstract vol. 014485, Oct. 23, 1990.
Kawada et al., Diaphragm for Speaker, Patent Abstracts of Japan, Abstract vol. 010275, Sep. 18, 1986.
Inoue, Laminated Material for Vibrating Parts and Vibrating Parts of Speaker, Patent Abstracts of Japan, Abstract vol. 015199, May 22, 1991 Feb. 2, 1994 European Search Report for EP 93 30 8391 and Annex thereto.

*Primary Examiner*—George F. Lesmes
*Assistant Examiner*—Kathryen E. Shelborne
*Attorney, Agent, or Firm*—Finnegan, Henderson, Farabow, Garrett and Dunner

[57] ABSTRACT

A speaker cone comprising a sheet (A) comprised of acrylic synthetic fibers, or a laminate of a sheet (A) and a sheet (B) comprised of the other fibers, in the shape of a cone, wherein the sheet (A) being comprised of acrylic synthetic fibers having a large number of long and narrow voids extending internally along the longitudinal direction, the voids have a nonspecific lateral cross-sectional shapes, the majority of the fibers present at the surface of the sheet (A) is divided into fine fibers, a large amount of undivided acrylic synthetic fibers are present in the inside of the sheet (A), and these fibers are made integral through mutual entanglement, and at least one of the surfaces of the cone shaped article has fused portions of the fibers.

10 Claims, 6 Drawing Sheets a

SPEAKER CONE AND PROCESS FOR PRODUCTION THEREOF

BACKGROUND OF THE INVENTION

1. Field of the Invention

The present invention relates to a speaker cone comprised of a novel material and to a process for the production of the same.

2. Description of the Related Art

As the material for conventional speaker cones, various materials have been used, such as natural wood pulp, synthetic pulp comprised of synthetic fibers or plastic, natural fibers, synthetic fibers, carbon fibers, glass fibers, or films of plastic (for example, polypropylene). Speaker cones are manufactured utilizing the characteristics of these materials.

Speaker cones using, as a raw material, natural wood pulp are produced by adding to a digested and beaten pulp various additives, such as fine carbon powder or resins, depending upon needs, to prepare a papermaking stock, forming this stock into paper in the shape of a speaker cone by a papermaking frame, then placing this in a speaker cone shaping mold, followed by applying heat and pressure.

This production process had the problems of a long, complicated process up to the preparation of the stock or raw materials. Also, since various additives, such as fine carbon powders and resins, were normally added, there was a remarkably detrimental effects on the work environment due to the splashing of these additives. Also, the waste water and solid waste including these additives are factors causing environmental pollution.

Also, as mentioned earlier, since the speaker cone is first made by a papermaking frame, there was a tendency for unevenness of thickness in the speaker cone thus shaped. In addition, there was a tendency for variation in the weights of the speaker cones produced. These posed a problem in quality control. How much the unevenness in thickness and the variation in weight can be reduced is an important point in the speaker conemaking process. At the present time, however, sufficient improvement has yet to be seen.

As one method of resolving the problem, the method may be considered of to first make the speaker cone stock and process it to a sheet shape in advance, then heat and press that sheet using a mold to form the speaker cone. In this method, however, since the speaker cone is three-dimensional, a drawing force acts on the sheet, but the sheet obtained by papermaking cannot sufficiently handle this drawing force and therefore the sheet will partially tear or stretch out of shape.

To give the sheet a strength able to handle the above-mentioned drawing force, it is preferable to use long fibers, but the length of the usable fiber when producing a sheet by the papermaking method is 1 to 5 mm. It is extremely difficult to make a uniform sheet by the papermaking method from a long fiber of over 5 mm length, in particular over 10 mm length.

Therefore, it is extremely difficult to form a speaker cone by the method of heating and pressing a sheet produced by papermaking using a mold as mentioned above.

When natural wood pulps are used as a raw material, the qualities thereof are varied based upon the origins of the woods and this causes the variances of the audio characteristics of the speaker cone obtained therefrom. In addition, even if the same natural wood is used, the audio characteristics are similarly varied depending upon the quality of water used for the production of pulps.

Furthermore, since the natural woods have high affinity with water, the speaker cone obtained therefrom is strongly influenced by humidity in using environments thereof, and therefore, the sound tone is remarkably changed. This influence provides remarkable limitation for the use of the speaker cone in, for example, outdoors or in the inside of automobiles.

Further, when the stock is a plastic, for example, polypropylene, the pellets of the plastic stock are shaped into a film, which is then vacuum molded. Thereafter, the bonding between the speaker cone body and the edge portions is improved by a plasma treatment, flame treatment, primary coating, or other processes.

In this way, when using a plastic such as polypropylene for the stock, the work up to the papermaking process is somewhat simplified over the case of using a natural wood material or synthetic pulp as the stock, but after shaping the speaker cone, complicated processes such as plasma treatment, flame treatment, or primary coating are necessary.

On the other hand, as a speaker cone produced by beating acrylic synthetic fibers to process them into a pulp and shaping that pulp, there are known a speaker cone comprised of a cone paper made by beating acrylic synthetic fibers having a large number of long and narrow voids inside them along the longitudinal direction to process them into a pulp, then making that pulp into paper (Japanese Unexamined Patent Publication No. 3-154600), a speaker cone comprised of a diaphragm formed by mixing and beating wood pulp and porous acrylic fibers and making the resultant mixed pulp into a paper (Japanese Unexamined Patent Publication No. 57-196694), etc.

Japanese Unexamined Patent Publication No. 3-154600 describes a speaker cone manufactured by papermaking the pulp comprising acrylic synthetic fibers having the special fiber structure, followed by forming the sheet into the speaker cone, there are fewer wrinkles occurring when forming it into a speaker cone compared with natural pulp, but in the papermaking process, due to the poor dispersability of the pulp in water, the occurrence of clumps of fibers is unavoidable and there are extremely large unevenness of thickness and variation of weight of the resultant speaker cones. Further, the pulp has a slower papermaking speed compared with natural pulp and is extremely low in productivity.

On the other hand, Japanese Unexamined Patent Publication (Kokai) No. 57-196694 discloses a speaker cone comprising a mixture of a porous acrylic fiber pulp and a wood pulp, and the production process thereof, there are problems similar to the case when producing a speaker cone from a natural wood pulp.

Further, these conventional speaker cones have the defect that the internal loss (tan$\delta$), one of the audio characteristics, is very susceptible to changes in the production conditions or the after-treatment, such as the resin coating of the speaker cone and the laminating of the speaker cone with a metallic foil. Further, when changing the audio characteristics by mixing in carbon fiber, an inorganic fiber, or an aromatic polyamide fiber or other high strength, high Young's modulus fiber, the internal loss changes considerably, so it was not possible to obtain a speaker cone having ideal audio characteristics.

Japanese Unexamined Patent Publication (Kokai) No. 2-175915 discloses acrylic synthetic fibers having a large number of long and narrow voids extending internally along the longitudinal direction and the production process thereof, Japanese Unexamined Patent Publication (Kokai) No. 2-200857 discloses a non-woven fabric comprising the above-mentioned fibers and the production method thereof.

SUMMARY OF THE INVENTION

Accordingly, the objects of the present invention are to solve the above-mentioned problems in the prior art and to provide a speaker cone, and a process for production thereof, which simplifies the production process of speaker cones, improves the work environment, and reduces the generation of waste and, further, which reduces the unevenness of thickness of the speaker cones and the variation in weight among cone products, stabilizes the quality of speaker cones, and reduces the changes in the internal loss caused when improving the audio characteristics by after-treatment and the intermixture of other fibers.

Another object of the present invention is to provide a speaker cone having no changes in the sound tone due to the influence of a humidity.

In accordance with the present invention, there is provided a speaker cone comprising a sheet (A) in the shape of a cone, said sheet (A) being comprised of acrylic synthetic fibers having a large number of long and narrow voids extending internally along the longitudinal direction, wherein the voids have a nonspecific lateral cross-sectional shapes, the majority of the fibers present at the surface of the sheet (A) is divided into fine fibers, a large amount of undivided acrylic synthetic fibers is present in the inside of the sheet (A), and these fibers are made integral through mutual entanglement, and further wherein at least one of the surfaces of the cone shaped article has fused portions of the fibers.

In accordance with the present invention, there is also provided a speaker cone comprising a laminate, in the shape of a cone, of a sheet (A) comprised of acrylic synthetic fibers and a sheet (B) comprised of the other fibers, wherein the sheet (A) comprised of acrylic synthetic fibers has a large number of long and narrow voids extending internally along the longitudinal direction, the voids have a nonspecific lateral cross-sectional shape, the majority of the fibers present at the surface of the sheet (A) is divided into fine fibers, a large amount of undivided acrylic synthetic fibers is present in the inside of the sheet (A), and these fibers are made integral through mutual entanglement.

In accordance with the present invention, there is further provided a process for producing a speaker cone comprising:

forming a sheet (A), comprised of acrylic synthetic fibers having a large number of long and narrow voids extending internally along the longitudinal direction, said voids having a nonspecific lateral cross-sectional shape, the majority of the fibers present at the surface of the sheet (A) being divided into fine fibers, a large amount of undivided acrylic synthetic fibers being present in the inside of the sheet (A), and these fibers being made integral through mutual entanglement, into a cone shape at a temperature of 100° to 250° C. and a pressure of 0.5 to 30 kg/cm².

In accordance with the present invention, there is still further provided a process for producing a speaker cone comprising:

forming a laminate of a sheet (A), comprised of acrylic synthetic fibers having a large number of long and narrow voids extending internally along the longitudinal direction, said voids having a nonspecific lateral cross-sectional shape, the majority of the fibers present at the surface of the sheet (A) being divided into fine fibers, a large amount of undivided acrylic synthetic fibers being present in the inside of the sheet (A), and these fibers being made integral through mutual entanglement, and a sheet (B) comprised of the other fibers into a cone shape at a temperature of 100° to 250° C. and a pressure of 0.5 to 30 kg/cm².

BRIEF EXPLANATION OF THE DRAWINGS

The present invention will be better understood from the description set forth below with reference to the accompaying drawings, wherein.

DESCRIPTION OF THE PREFERRED EMBODIMENTS

The acrylic synthetic fibers present at the surface of the sheet (A) (meaning the front and back surfaces of the sheet (A), the same as hereinbelow) must be divided into a large number of thinner fine fibers over the entire length thereof, but sometimes there may be fibers partially divided in the longitudinal direction and further undivided fibers. It is necessary, however, that the majority of the acrylic synthetic fibers present on the surface of the sheet (A) be divided. More specifically, it is preferable that at least 70% by weight (hereinafter, "%", unless specifically noted otherwise, meaning "% by weight"), more preferably at least 90% of the fibers be divided. When there is a large amount of undivided fibers present on the surface of the sheet (A), the entanglement among fibers becomes insufficient and the sheet (A) will be damaged when forming the sheet (A) into a speaker cone.

The fibers present on the surface of the sheet (A) are mutually entangled and form the fiber layer of the surface of the sheet (A).

Further, the majority of the acrylic synthetic fibers present inside sandwiched between the fiber layers of the surface of the sheet (A) are undivided fibers, but there are also some partially divided fibers and further there are some divided fine fibers. The undivided fibers preferably are present in an amount of at least 70%, more preferably at least 90%. These fibers are mutually entangled to form the intermediate fiber layer of the sheet (A). Further, the fibers of the fiber layers of the surface and the intermediate fiber layer are mutually entangled and form an integral whole to form a three-layer structure sheet (A) comprised of surface fiber layers and an intermediate fiber layer.

The intermediate fiber layer, comprised of acrylic synthetic fibers at the inside of the sheet (A), the majority of which are undivided, has an effect on the internal loss, one of the audio characteristics of a speaker cone. Due to the specific fiber structure of these fibers, there is the specific effect of reducing to a large degree the changes in the internal loss caused by changes in the manufacturing conditions of the speaker cone and the changes in the internal loss caused by the after-treatment of the speaker cone.

Figure 1:
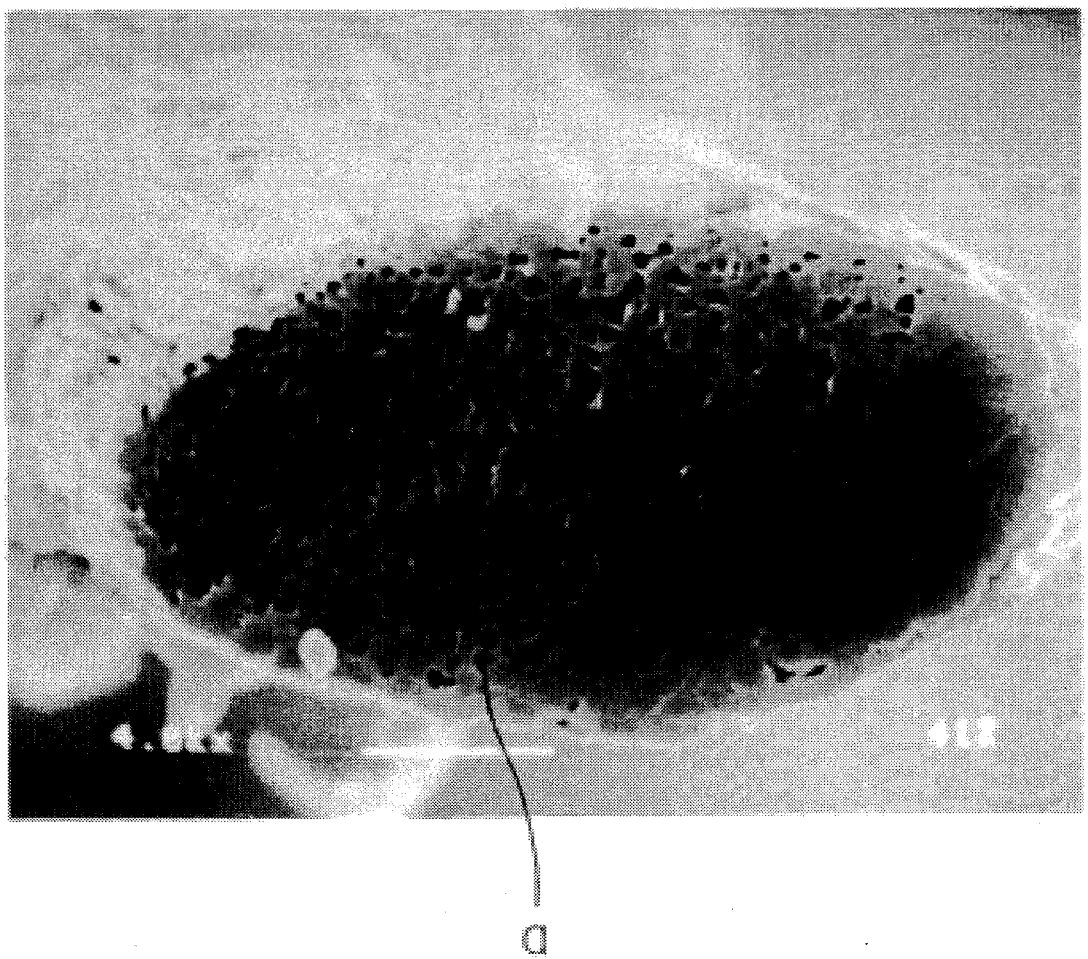
FIG. 1 is an electron micrograph (4000X) showing the fiber shape in a lateral cross-section of an acrylic synthetic fiber constituting the speaker cone of the present invention.
Figure 2:
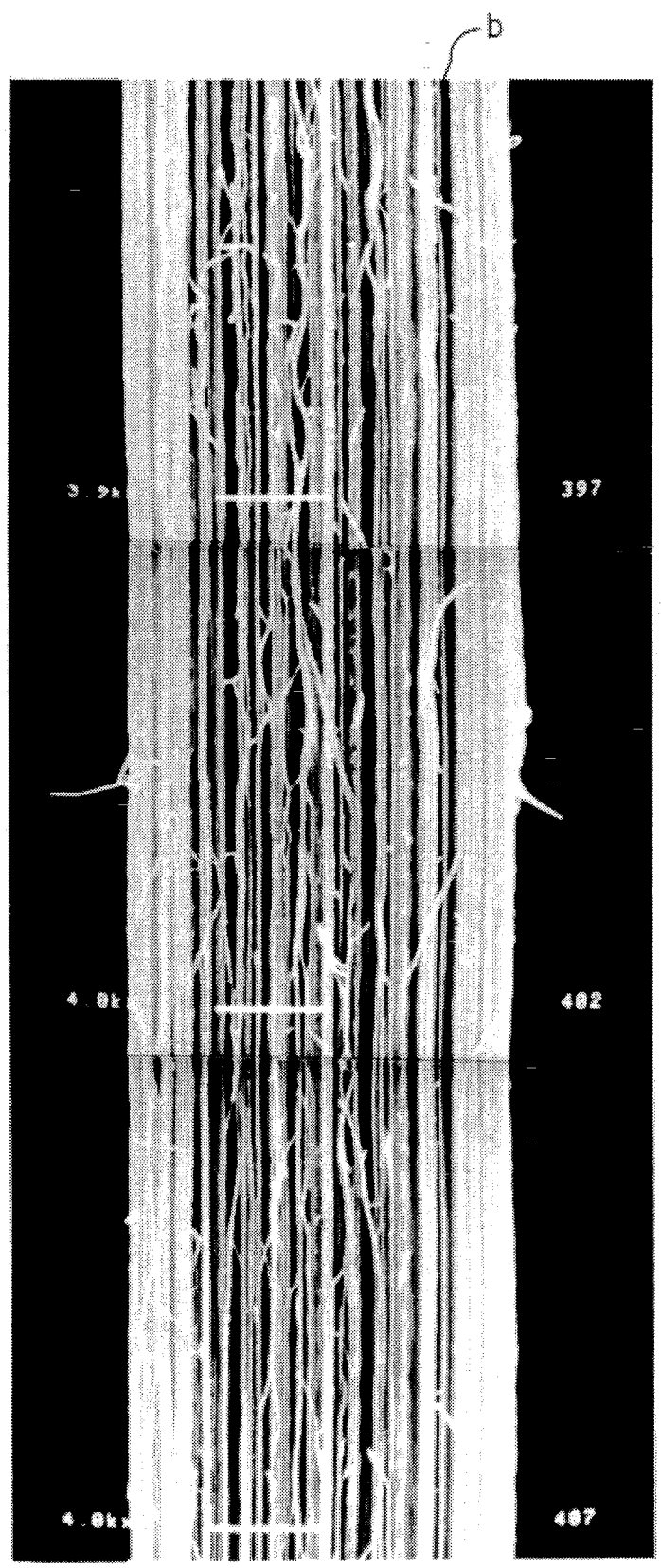
FIG. 2 is an electron micrograph (4000X) showing the fiber shape in a longitudinal cross-section of an acrylic synthetic fiber constituting the speaker cone of the present invention.

An electron micrograph (4000X) of the lateral cross-section of an undivided acrylic synthetic fiber is shown in FIG. 1 and an electron micrograph (4000X) of the longitudinal cross-section is shown in FIG. 2.

In FIG. 1, the black portions (a) are cross-sections of the voids. These come in various shapes, such as substantially circular shapes, flat shapes, and shapes with repeated curves. The cross-sectional areas are also not fixed, being large or small. It will be understood that a large number of long and narrow voids having nonspecific cross-sectional shapes are dispersed irregularly in the fiber.

In FIG. 2, in the same way, the black portions (b) are the above-mentioned voids. It will be understood that these voids extend substantially in parallel along the longitudinal direction of the fiber.

The acrylic synthetic fibers having the abovementioned special fiber structure have the unique property of dividing into a large number of thinner fine fibers along the longitudinal direction of the fibers by the action of an external force. To facilitate the division, it is preferable that the length of the long and narrow voids be at least 60 μm.

Further, adjoining long and narrow voids may be partially connected with each other by pores. Also, the number of long and narrow voids in a lateral cross-section of the fibers is preferably at least 100 so as to facilitate the division into fine fibers by the above external force.

This acrylic synthetic fibers are produced in the following way from an acrylic polymer.

The acrylic polymer is a polymer of at least 50% acrylonitrile units (hereinafter abbreviated as "AN") and another monomer able to be copolymerized with AN or a mixed polymer of a mixture of these polymers.

When the AN is less than 50%, the inherent thermal characteristics of acrylic polymers of being nonfusible and thermoplastic are lost and it becomes difficult to retain the cone shape when the sheet (A) or a laminate of this with a sheet (B) is placed in a mold and heated and pressed to shape it into a cone. There is no upper limit on the content of the AN and a 100% AN polymer is also possible. Even when the acrylic polymer is a mixed polymer of two or more types of acrylic polymers, the content of the AN must be at least 50% based on the weight of the mixed polymer.

The monomer copolymerizable with the AN may be a conventionally known one, such as acrylic acid, methacrylic acid, and esters of the same (methyl acrylate, ethyl acrylate, methyl methacrylate, ethyl methacrylate, etc.), vinyl acetate, vinyl chloride, vinylidene chloride, acrylamide, methacrylamide, methacrylonitrile, allylsulfonic acid, methallylsulfonic acid, styrene sulfonic acid, and their sodium salts, potassium salts, ammonium salts, vinylpyridine, N,N-dimethylaminoethylmethacrylate, etc.

The above-mentioned acrylic polymer and polyalkyleneglycol are dissolved in a conventionally known acrylic polymer solvent, for example, a solvent such as dimethylformamide, dimethylacetoamide, dimethylsulfoxide, a concentrated aqueous solution of a rhodan salt, a concentrated aqueous solution of zinc chloride, and an aqueous solution of nitric acid to prepare a spinning stock solution. The optimal concentration of the acrylic polymer in the spinning stock solution differs depending on the solvent, but is generally preferably 10 to 30%.

The addition of this polyalkyleneglycol is an important requirement for the formation of the abovementioned long and narrow voids. The polyalkyleneglycol is a random copolymer or a block copolymer consisting of ethylene oxide and propylene oxide copolymerized in the range of a weight ratio of 80:20 to 20:80 and has a number average molecular weight of 5,000 to 50,000, preferably 6,000 to 20,000.

When the number average molecular weight of the polyalkyleneglycol is smaller than 5,000, long and narrow voids extending continuously along the longitudinal direction of the fiber are not formed and the result is porous fibers with very fine substantially spherical voids. On the other hand, if the number average molecular weight is over 50,000, the result is fibers with giant sinewy voids and, further, fibers having at most several dozen voids in the lateral cross-section of the fibers. This type of fibers is difficult to divide into fine fibers by external force and is not suited as the fibers for the speaker cone of the present invention. To obtain fibers having long and narrow voids which extend along the longitudinal direction of the fibers and have nonspecific sectional shapes in the lateral cross-section, it is particularly preferred that the number average molecular weight of the polyalkyleneglycol be from 10,000 to 20,000.

Further, the spinning dope prepared by dissolving the polyalkyleneglycol in the above way is ripened for at least 4 hours after preparation. The ripening of the spinning dope is an essential requirement for obtaining acrylic synthetic fibers having a large number of long and narrow voids continuing along the longitudinal direction of the fibers.

Here, "ripening" means for example allowing the spinning dope prepared by dissolving the acrylic polymer and the polyalkyleneglycol to stand or gently transferring it without vigorous agitation or shaking.

It is not certain due to what kind of reasons the long and narrow voids mentioned above are formed in the acrylic synthetic fiber as a result of the ripening of the spinning dope containing the polyalkyleneglycol, but the following is guessed: That is, the ripening of the spinning dope causes agglomeration of the polyalkyleneglycol. When the spinning dope passes through the pipe and is spun into the coagulating medium from the fine holes of the spinneret, a shearing force acts on the spinning dope, so fine sinews are formed in the polyalkyleneglycol. Due to the difference in the coagulation characteristics of the acrylic polymer, which coagulates, and the polyalkyleneglycol, which does not, voids with complicated shapes as mentioned above are caused by the phase separation of the two polymers. The ripening time may be a longer time than 4 hours and 4 to 10 hours are preferred.

The amount of the polyalkyleneglycol added is 5 to 20% with respect to the acrylic polymer, preferably 10 to 15%. When the amount added is less than 5%, the abovementioned long and narrow voids become fewer, while when over 20%, the fibers break during the fiber forming process, the fibers are divided into thinner fine fibers, or other problems arise and stable spinning becomes no longer possible. When the amount added is 10 to 15%, the best balance is achieved in the number of the long and narrow voids, the stability of the spinning, etc., and therefore, this range is preferable.

This spinning dope is passed through the spinneret and extruded into a coagulating medium of the spinning dope to form coagulated yarn bodies. These coagulated yarns are rinsed, drawn, dried, heat treated, and subjected to other various types of treatment to produce acrylic synthetic fibers having a large number of long and narrow voids inside them extending along the longitudinal direction. The polyalkyleneglycol added to the spinning dope is dissolved out from the coagulated yarn bodies during the coagulation, rinsing, drawing, and other processes.

The spinning method may be any method such as the wet spinning method, dry spinning method, or dry-wet spinning method. After spinning, it is preferable to rinse and draw in an aqueous medium to dissolve out the polyalkyleneglycol from the coagulated yarn bodies.

The acrylic synthetic fibers produced by the abovementioned method are easily divided into a large number of finer fine fibers along the longitudinal direction by the action of external force.

Accordingly, utilizing these characteristics, a sheet (A) for the above-mentioned speaker cone is obtained by making a nonwoven fabric from a web comprised of acrylic fibers by, for example, the conventionally known columnar flow punching treatment using high pressure water. Due to this treatment, the majority of the acrylic synthetic fibers present on the surface of the nonwoven fabric are divided into a large number of thinner fine fibers along the longitudinal direction of the same. At this time, the surface of the nonwoven fabric sometimes also has acrylic synthetic fibers which are partially divided along the longitudinal direction of the fibers or acrylic synthetic fibers which are undivided, but it is preferable that all the fibers present on the surface of the nonwoven fabric to be divided fine fibers. The divided fine fibers are distributed randomly at certain portions and are collected into bundles in other locations. The fibers on the surface of the nonwoven fabric are mutually entangled and form the fiber layers of the surface.

On the other hand, the majority of the fibers present inside the nonwoven fabric are undivided acrylic synthetic fibers. Sometimes, there may be partially divided acrylic synthetic fibers and, further, divided fine fibers formed by the division of the acrylic synthetic fiber as well. However, it is necessary that at least 70%, preferably at least 90%, of the fibers present inside the nonwoven fabric be undivided fibers.

Due to the above-mentioned columnar flow punching treatment using high pressure water, the acrylic synthetic fibers present near the surface of the nonwoven fabric are divided and, at the same time, the divided fine fibers are entangled with each other, thereby forming the fiber layers of the surface of the sheet (A). Further, the fibers inside sandwiched in by the surface fiber layers are simultaneously entangled to form the inside fiber layer. Also, the fibers forming the surface fiber layers and the inside fiber layer are entangled to form an integral body and thereby form the speaker cone sheet (A) of the present invention.

The extent of the division of the acrylic synthetic fiber can be adjusted by changing the magnitude of the external force applied to the fiber. Further, the state of the division of the resultant fine fibers and the extent of the entanglement of the fibers can be adjusted by the magnitude of the external force.

The length of the acrylic synthetic fibers constituting the sheet (A) is not particularly limited. Use can be made of both long fibers and short fibers. In view of the shape retention of the speaker cone, however, fibers of a length of 20 to 150 mm are preferable. Fibers of a length of 30 to 80 mm are further preferable.

The "METSUKE" (i.e., fiber weight per unit area) of the nonwoven fabric differs depending on the application, characteristics, etc. of the desired speaker cone, but usually is 50 to 500 g/m$^2$ preferably 100° to 300 g/m$^2$.

The nozzle diameter used in the high pressure water columnar flow punching is usually 0.05 to 1 mm, preferably 0.1 to 0.5 mm. The pressure of the high pressure water columnar flow is 20 to 100 kg/cm$^2$, preferably 40 to 80 kg/cm$^2$.

The speaker cone comprised of the sheet (A) of the present invention is obtained by placing the sheet (A) comprised of the above-mentioned acrylic synthetic fibers in a mold of a predetermined shape and then shaping it under a predetermined temperature and pressure. The temperature at this time is 100° to 250° C., preferably 150° to 200° C. the pressure is 0 5 to 30 kg/cm$^2$, preferably 1 to 10 kg/cm$^2$, and the shaping time is 1 to 60 seconds, preferably 2 to 10 seconds.

By the shaping under the above-mentioned conditions, a speaker cone is obtained with fused portions of the fine fibers formed by the division of the acrylic synthetic fibers (partially divided fibers and undivided fibers included in some cases) on at least one of the surfaces of the speaker cone.

When the shaping temperature exceeds 250° C., the acrylic synthetic fiber changes in nature or decomposes to make shaping difficult. When the pressure exceeds 30 kg/cm$^2$, there is tremendous fusing of fibers at the surfaces of the sheet (A), again making shaping difficult. With a shaping temperature less than 100° C. and a pressure less than 0.5 kg/cm$^2$, the shape retention of the speaker cone becomes poor and it becomes impossible to form fused portions of the fibers at the surfaces of the sheet (A).

By suitably adjusting the conditions in the above ranges, it is possible to produce speaker cones having various properties. Further, the mold may be suitably changed in design in accordance with the shape etc. of the desired speaker cone.

Figure 3:
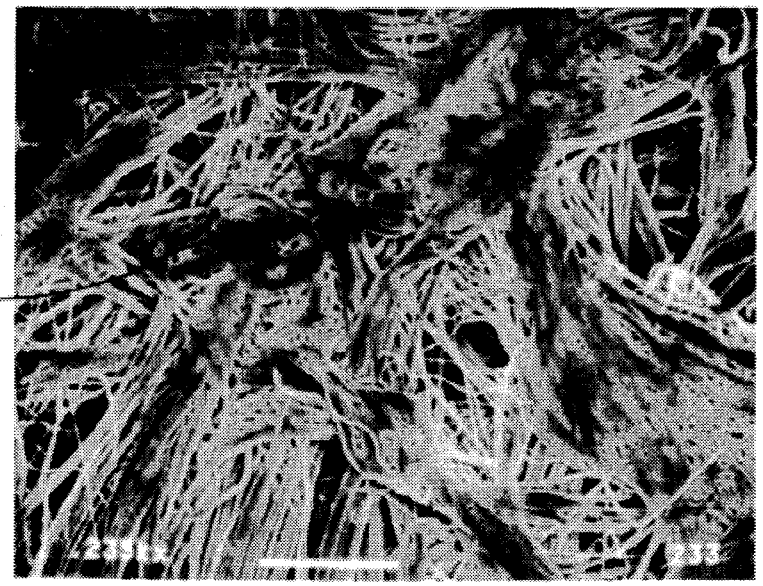
FIG. 3 is an electron micrograph (235X) showing the state of the inside surface of a speaker cone produced in Example 1 of the present invention.
Figure 4:
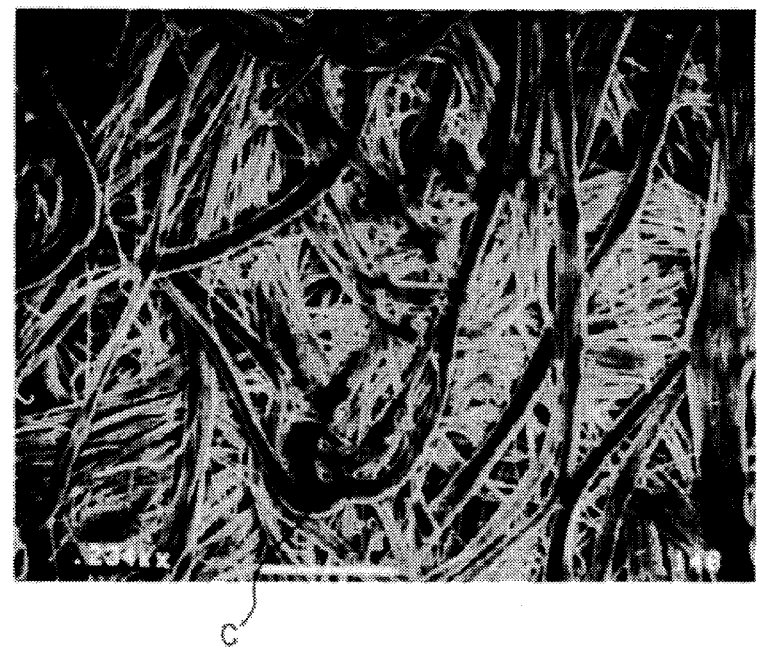
FIG. 4 is an electron micrograph (234X) showing the state of the outside surface of a speaker cone produced in Example 1 of the present invention.

FIG. 3 and FIG. 4 are electron micrographs (235X and 234X) which show the inside surface of an example (Example 1) of a speaker cone of the present invention and the state of the outside surface.

In the figures, it will be seen that the acrylic synthetic fibers present at the inside surface and outside surface of the speaker cone are divided into a large number of thinner fine fibers along the longitudinal direction of the same, these fine fibers are widely dispersed in certain portions of the surface of the speaker cone and are collected into bundles in other portions, and these fibers are mutually entangled. Further, these fine fibers present at the inside surface and outside surface of the speaker cone are closely in contact with each other and are partially fused and adhered in some areas due to the heat and pressure (in FIG. 3 and FIG. 4, the blackened portions c). At the portions of the fused fine fibers, areas where the fibers have been resinified also appear. Further, there are undivided acrylic fibers present between the inside surface and outside surface of the speaker cone, that is, in its inside.

Figure 5:
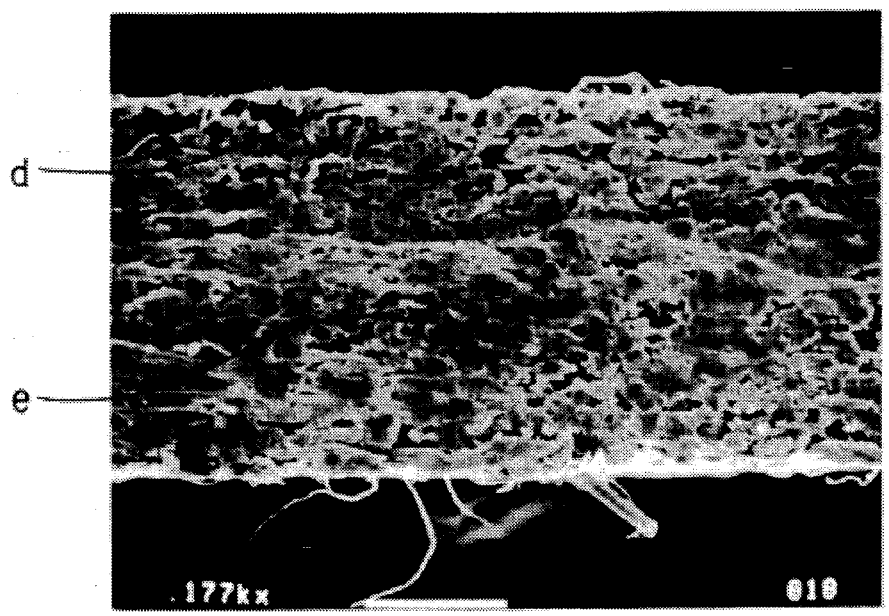
FIG. 5 is an electron micrograph (177X) showing the cross-sectional shape of a speaker cone produced in Example 1 of the present invention.

FIG. 5 is an electron micrograph (177X) showing the state of the cross-section of the speaker cone shown in FIG. 3 and FIG. 4. In FIG. 5, the top surface corresponds to the inside surface of the speaker cone, while the bottom surface corresponds to the outside surface. As will be understood from the photograph, at the inside surface and outside surface of the speaker cone, portions are recognized where the fine fibers formed by the division of the acrylic synthetic fibers are heated and pressed at the time of shaping to fuse and resinify and form a thin film (white, opaque portions d).

Further, as will be understood from FIG. 5, the majority of the acrylic synthetic fibers present inside the speaker cone in the direction of thickness of the sheet are undivided acrylic synthetic fibers. These undivided acrylic synthetic fibers mutually entangle to form an intermediate fiber layer. At the same time, the divided fine fibers forming the fiber layer of the surfaces are entangled so all fibers are joined into a whole. The intermediate fiber layer present inside the sheet accounts for the majority of the sheet.

The fibers present inside in the longitudinal direction are merely strongly pressed together by close contact among the fibers and are not fused. Further, there are many spaces (for example, e) between the fibers.

The undivided acrylic synthetic fibers present inside the sheet are acrylic synthetic fibers of a structure almost no different from before shaping into a speaker cone (having a large number of long and narrow voids extending in the longitudinal direction) even after shaping into a speaker cone. Since a large number of acrylic synthetic fibers having fiber structures almost no different from before shaping are present inside the shaped speaker cone, it was found that even after the speaker cone has been treated by various types of after-treatment, there is almost no change in the internal loss (tanδ), one of the audio characteristics.

Next, an explanation will be given of a speaker cone comprised of a laminate of the above-mentioned sheet (A) and sheet (B).

The speaker cone is obtained by shaping under the same heat and pressure conditions as mentioned before a laminate of the sheet (A) and, for example, a nonwoven cloth, woven cloth, knit cloth, or other sheet (B).

The sheet (B) is used laminated with the sheet (A). In accordance with the type of the fiber forming the sheet (B), compared with a speaker cone made of merely the sheet (A), it is possible to obtain such superior effects as enabling the shape retention, strength, and handling property of the speaker cone to be improved or use made of the speaker cone in a further severe high temperature and high humidity environment (e.g., outdoors, insides of automobiles). Further, it is possible to change the other audio characteristics without changing the internal loss.

The sheet (B) is preferably a nonwoven fabric in view of the ease of manufacture of the sheet (B), the ease of manufacture of a laminate of this with the sheet (A), the ease of the shaping of the speaker cone, and the uniformity.

The fibers forming the sheet (B) are preferably heat fusible fibers when the main object is the improvement of the strength and shape retention of the speaker cone as well as the prevention of the changes in the audio characteristics under high temperature and high humidity environment. Further, to improve the audio characteristics, use may be made of various fibers in accordance with the audio characteristics.

The heat fusible fibers may be polyethylene fibers, polypropylene fibers, or other polyolefin fibers, polyamide fibers, polyester fibers, polyvinyl alcohol fibers, polyvinyl chloride fibers, or polyvinylidene fibers, but polypropylene fibers are preferred from the viewpoint of the ease of shaping of the speaker cone and the shape retention of the speaker cone as well as the prevention of the changes in the audio characteristics under a high temperature and high humidity environment.

The denier of the heat fusible fibers is preferably at most 10 denier. In particular, an ultrathin fiber of less than 0.5 denier is preferable from the viewpoint of the uniformity of the resultant speaker cone having a small unevenness in the thickness and the weight.

On the other hand, the fibers used for improving the audio characteristics may be carbon fibers, flame resistant fibers, glass fibers, mineral fibers, aromatic polyamide fibers, aromatic polyester fibers, cotton or other cellulose fibers, natural wood pulp fibers, etc. Carbon fibers are preferred.

The above-mentioned carbon fibers and flame resistant fibers are fibers produced from acrylic synthetic fibers, cellulose fibers, oil or oil pitch fibers, etc.

The length of the fibers forming the sheet (B) is not particularly limited. Use may be made of both long fibers and short fibers.

The "METSUKE" of the sheet (B) comprised of the above fibers differs depending on the object of improvement, such as the shape retention and audio characteristics, but usually is 10 to 300 g/cm$^2$, preferably 20 to 100 g/cm$^2$. Further, the ratio of the sheet (B) in the speaker cone is 5 to 50%, preferably 10 to 30% by weight.

When the fibers forming the sheet (B) is heat fusible fibers, if the "METSUKE" of the sheet (B) becomes smaller, there is little effect of improvement of the bonding strength affixing the fibers forming the sheet (A), while it becomes larger, the bonding strength becomes greater. At the same time, the Young's modulus and the sonic velocity become higher and faster without much change in the internal loss of the speaker cone at all.

Therefore, by suitably selecting the basis weight of the sheet (B) comprised of the heat fusible fibers, it is possible to easily improve the bonding strength of the fibers and at the same time improve the characteristics of the speaker cone.

Further, when the fibers forming the sheet (B) are high strength or high Young's modulus fibers like carbon fibers, there is almost no change in the internal loss of the speaker cone, the sonic speed becomes faster, the Young's modulus can be improved, and an ideal speaker cone with greater transparency in feeling and a sonic speed close to that of nature results.

The laminate of the sheet (A) and the sheet (B) is a laminate of two or more layers of the sheet (A) and (B) alternately superposed. The laminate is not particularly limited so long as it has at least two layers, but a three-layer laminate with sheets (A) sandwiching in the two sides of the sheet (B) is preferable.

The speaker cone can be manufactured by placing this laminate in a mold of a predetermined shape and shaping it into a cone under a predetermined temperature and pressure. The shaping conditions are similar to the shaping conditions of a speaker cone comprised of the sheet (A).

Figure 8:
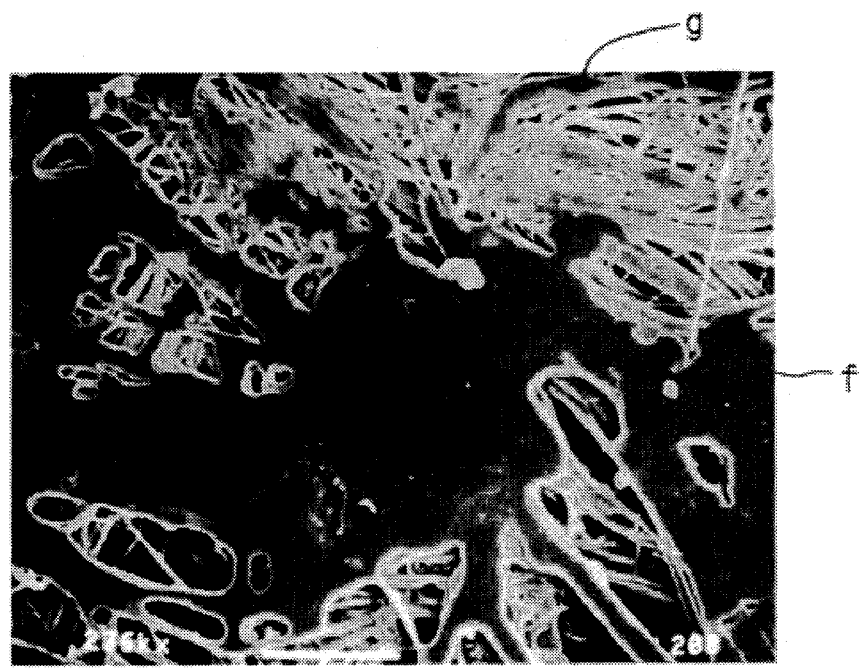
FIG. 8 is an electron micrograph (236X) showing the state of the inside surface of a speaker cone produced in Example 5.
Figure 9:
FIG. 9 is an electron micrograph (234X) showing the state of the outside surface of a speaker cone produced in Example 5.

FIG. 8 and FIG. 9 are electron micrographs (236× and 234X) showing the state of the inside surface of a speaker cone (Example 5) formed by shaping by a mold under heat and pressure a three-layer laminate comprised of a 0.1 denier polypropylene fiber nonwoven fabric (sheet (B)) sandwiched at its two sides by sheets (A) and the state of the outside surface of the same, respectively.

The acrylic synthetic fibers present at the inside and outside surfaces of the speaker cone are divided into thinner fine fibers along the longitudinal direction. These fibers are mutually entangled and are affixed by the fused bodies of the propylene fibers shown by the letter (f). Further, these fine fibers present at the inside surface and the outside surface of the speaker cone are closely in contact with each other and are partially fused by the heat and pressure to be bonded together in some areas (in FIG. 8, the blackened portions g).

Figure 10:
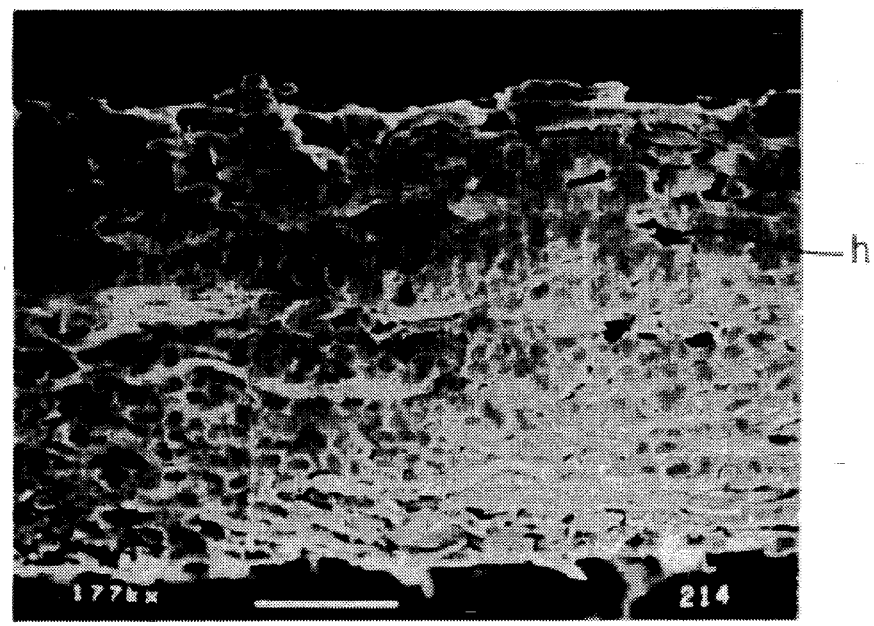
FIG. 10 is an electron micrograph (177X) showing the cross-sectional shape of a speaker cone produced in Example 5.

FIG. 10 is an electron micrograph (177X) showing the state of the cross-section in the speaker cone shown in FIG. 8 and FIG. 9. In FIG. 10, the top surface corresponds to the inside surface of the speaker cone and the bottom surface corresponds to the outside surface. As will be understood from FIG. 10, there are undivided acrylic synthetic fibers inside the speaker cone in the longitudinal direction of the sheet.

These undivided acrylic synthetic fibers are mutually entangled and form an intermediate fiber layer. At the same time, the divided fine fibers forming the fiber layers at the surface thereof also are entangled so all the fibers are integrally bonded together.

Even after shaping into the speaker cone, the undivided acrylic synthetic fibers present inside the sheet (A) remain almost unchanged in structure from the state before shaping.

The undivided acrylic synthetic fibers present at the inside in the thickness direction and the divided fine acrylic synthetic fibers are bonded by the melting of the polypropylene, but are not fused together.

Further, compared with a speaker cone comprised of just the sheet (A) (see FIG. 5), the inside acrylic synthetic fibers are denser due to the bonding by the melting of the polypropylene fibers. Further, there is considerable space (for example, h) among the fibers.

When producing a nonwoven fabric comprised of the above-mentioned acrylic synthetic fibers as the sheet (A) for the speaker cone of the present invention, it is possible to mix in another fiber, for example, a natural wood pulp, carbon fiber, aromatic polyamide fiber, or mineral fiber in an amount of up to 10 percent in accordance with the properties sought for the speaker cone. Further, it is possible to add additives such as carbon powder, resin powder, coloring agents, or ceramics. Still further, it is possible to treat the shaped speaker cone by impregnating it or coating it with resin, depositing a metal on it, or coloring it so as to impart various characteristics to the speaker properties and design.

Regarding shape retention

The sheet (A) of the present invention has the feature of vastly improved physical properties, such as the tensile strength of the sheet (A), due to facts such as (1) the special fiber structure of the acrylic synthetic fibers forming the sheet (A), (2) the special sheet structure of the sheet (A), and (3) the ability to make the sheet (A) without relying on the papermaking method and therefore the ability to form a uniform sheet using fibers of long length.

These structural and physical factors possessed by the above-mentioned sheet (A) and the thermal characteristic inherently possessed by an acrylic synthetic resin of being non-heat fusible nature and heat-plastisity nature together so that when shaping the sheet (A) into a speaker cone by a mold, it is possible for the sheet (A) to sufficiently handle the drawing force applied to it. Therefore, when shaping the sheet (A) into a speaker cone having a three-dimensional shape, it is possible to shape it into a uniform speaker cone without any tearing or warping of the sheet (A).

Further, a speaker cone comprised of the sheet (A) has in at least one of its surfaces portions where the fibers present on the surface of the sheet (A) are fused and has inside it undivided acrylic synthetic fibers.

The fused portions contribute tremendously to the shape retention of the speaker cone and are important factors behind the strong retention of the shape of the speaker cone, despite the present of undivided acrylic synthetic fibers inside the sheet (A) formed into a cone shape and the large amount of spaces between the fibers.

Further, even in a speaker cone formed from a laminate of the sheets (A) and (B) comprised of non-heat fusible or barely heat fusible fibers like carbon fibers inside the same, the fused portions present on the surface are major factors helping to strongly retain the shape.

On the other hand, a speaker cone comprised of a laminate formed by laminating a sheet (B) comprised of heat fusible fibers with the sheet (A) is improved in the shape retention further due to the strong bonding of the fibers forming the sheet (A) due to the melting of these heat fusible fibers.

In this case, the above fused portions are not necessarily required for the surface of the speaker cone, but the fused portions are preferably present to improve the strength.

The fused portions of the acrylic synthetic fibers can be formed on at least one surface by forming the sheet (A) or the laminate of the sheet (A) and the sheet (B) into a speaker cone at a temperature of 100° to 250° C. and a pressure of 0.5 to 30 kg/cm$^2$.

Figure 6:
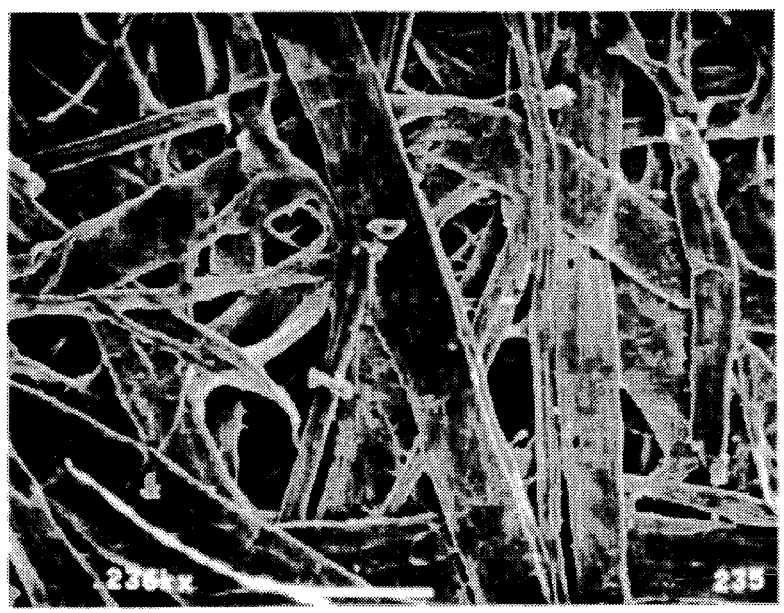
FIG. 6 is an electron micrograph (236X) showing the state of the inside surface of a conventional speaker cone produced from a natural pulp.

Note that FIG. 6 is an electron micrograph (236X) showing the state of the inside surface of the speaker cone produced from natural pulp. From a comparison of this figure and FIG. 3 (of the present invention), it will be understood that natural pulp fibers are thicker than fibers in the speaker cone of the present invention and there is no fusing among the fibers.

Regarding audio characteristics

The speaker cone comprised of the sheet (A) of the present invention, as mentioned above, includes acrylic synthetic fibers having a large number of long and narrow voids extending in the longitudinal direction without change in the fiber structure inside in the thickness direction compared with before the shaping into a speaker cone even after the shaping.

Further, as mentioned above, the fine fibers formed by the division of the acrylic synthetic fibers are widely dispersed in some portions of the surface of the speaker cone and are present in the form of collections of bundles at other portions of the surface.

The audio characteristics of the speaker cone comprised of the acrylic synthetic fiber are a Young's modulus of $0.7 \times 10^{10}$ to $2.5 \times 10^{10}$, a sonic velocity of 1100 to 2000, and a tan$\delta$ of 0.040 to 0.060.

These facts and the heat characteristics inherently possessed by acrylic synthetic fibers act synergistically and cause the following characteristics sought in speaker cones, in particular with regard to the internal loss.

That is, the internal loss of a speaker cone using natural pulp changes depending on the shaping temperature and pressure, changes depending on the resin processing or lamination of aluminum or another metal, and changes depending on the type of the fiber mixed with the natural pulp. The speaker cone of the present invention, however, has an internal loss of a value similar to the internal loss in the case of natural wood pulp, which is considered ideal. Further, the internal loss does not change much at all due to this treatment.

Figure 7:
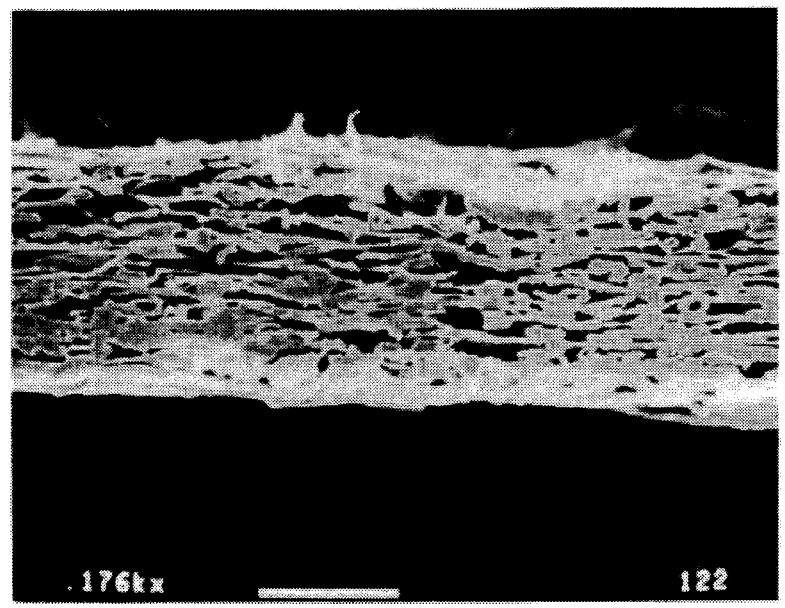
FIG. 7 is an electron micrograph (176X) showing the cross-sectional shape of a conventional speaker cone produced from a natural pulp.

FIG. 7 is an electron micrograph (176X) showing the state of the cross-section of a speaker cone produced from natural pulp. As mentioned earlier, the speaker cone of the present invention has fine, uniform spaces and forms a dense, uniform layer overall (see FIG. 5), while a speaker cone comprised of natural wood pulp, as will be understood from FIG. 7, has rough, nonuniform spaces and forms a rough, nonuniform layer overall.

The size and distribution of the spaces present inside the speaker cone of the present invention can be adjusted by suitably changing the pressure and temperature used during the shaping process. Due to this, it is possible to freely change the sonic speed, another characteristic of a speaker cone, by changing the shaping pressure or temperature of the metal laminate and other treatment conditions. Further, it is possible to improve the strength by lamination with heat fusible fibers, laminate high strength and/or high Young's modulus fibers such as carbon fibers to change the sonic velocity, Young's modulus, etc. and thereby produce a wide range of speaker cones with different sound qualities. At this time, as mentioned earlier, the internal loss does not change much at all.

Furthermore, the quality of the natural wood pulp is varied based upon the origins thereof and the quality of water in the papermaking of a pulp is different from the production area of the speaker cone. The quality of the natural wood pulp and the quality of water largely affect the audio characteristics of the speaker cone, and therefore, the variation in the quality of the natural wood and the difference in the quality of water make remarkably difficult to produce the speaker cone having no variance in the qualities of, for example, audio characteristics. Furthermore, the natural wood pulp has high affinity to water, and therefore, the speaker cone heretobefore produced from the natural wood is subjected to the influence of humidity and the deterioration in the audio characteristics and the change in the shape. These disadvantages remarkably limit the use of the speaker cone in an environment such as the outdoors and the inside of automobiles where the humidity and temperature are vigorously changed.

However, the stock of the speaker cone according to the present invention has a constant quality and no substantial affinity to water. Accordingly, the speaker cone of the present invention has no variation in the audio characteristics and is not affected by the humidity and temperature. Therefore, the present speaker cone can be used in a more severe environment (e.g., outdoors, insides of automobiles) where the humidity and the temperature are vigorously changed.

EXAMPLE

The present invention will now be further illustrated by, but is by no means limited to, the following Examples.

First, the acrylic synthetic fibers for forming the speaker cone sheet (A) were prepared in the following way.

A copolymer of a composition of 95.0% AN, 4.5% methyl acrylate, and 0.5% sodium methylsulfonate and a block polyester of polyethyleneoxide-polypropyleneoxidepolyethyleneoxide (number average molecular weight of 10,000 and polymerization ratio of polyethyleneoxide: polyethyleneoxide=70:30) were dissolved in dimethylformamide to prepare a spinning dope containing 23% copolymer and 2.3% block polyester.

This spinning dope was then allowed to stand for 6 hours, then was passed through a spinneret having fine holes of 0.08 mm diameter and extruded into a water-based coagulating bath of 35° C. containing 75% dimethylformamide and 25% water to produce coagulated yarn. Next, the coagulated yarn were rinsed and then were drawn 10-fold in boiling water, then were dried in hot air of 80° C. to produce the acrylic synthetic yarn. The yarn were then given crimps and cut into fibers of a length of 76 mm.

The denier of the fibers was 2 denier, the tensile strength 3.2 g/denier, and the tensile elongation 32%.

Electron micrographs showing the lateral cross-section and longitudinal cross-section of the fiber are shown in FIG. 1 and FIG. 2 (4000X). As will be understood from these figures, the fibers have an extremely large number of long and narrow voids extending along the longitudinal direction.

The fibers were formed into three webs of basis weights of 100, 120, and 200 g/m² using a spinning carding machine.

These webs were placed on a wire screen moving at a speed of 4 m/minute and were sprayed with high pressure water of 60 kg/cm² from a nozzle having fine holes of 0.1 mm diameter arranged in a single row at 0.8 mm intervals to treat the webs.

The treatment was repeated 10 times alternately on the front and the rear of the webs, then the resultant nonwoven sheets (sheet (A)) were dried in hot air of 80° C.

In the sheets (A) produced by the above method, the fibers present at the front and the rear were divided in a large number of thinner fine fibers. These fine fibers were widely dispersed in certain portions and were collected in bundles in other portions. Between the front and the rear surfaces of the sheets, there were undivided acrylic synthetic fibers. All these fibers were entangled with each other to make an integral whole.

Further, the degree of division of the fibers fell in the direction from the front to inside of the sheets (A). At the interface portion between the inside fiber layer comprised of the undivided fibers and the fiber layers at the surface, there were partially divided fibers.

The thus obtained three types of sheets (A) were used to produce various types of speaker cones.

The density, Young's modulus, sonic velocity, and tanδ in the examples were measured by the following methods:

1. Density: The density was calculated by calculation by the weight per unit area and the volume.

2. Young's modulus: The Young's modulus was measured by the cantilever vibrating reed method.

A sample of a width of 1 cm and a length of 2 cm was measured for the $f_r$ at several points while changing the length. $(E/\rho)^{1/2}$ in the equation $f_r=0.1615$ $d/l^2$ $(E/\mu)^{1/2}$ was calculated from the gradient of the line in the graph using $f_r$ as the vertical axis and $1/l^{1/2}$ as the horizontal axis. The Young's modulus E was calculated from the value of $(E/\rho)^{1/2}$ and the density.

In the above equation, l: length of sample d: thickness of sample

3. Sonic velocity: The sonic velocity is $(E/\rho)^{1/2}$.

4. tanδ: Calculated from the attenuation waveform chart by the following equation:

$$\tan\delta = 1/(n-1) \cdot 1/\pi \cdot \ln A_1/A_n$$

$A_1$: Waveheight of 1st wave $A_n$: Waveheight of n-th wave

EXAMPLE 1

Sheets (A) of "METSUKE" of 200 g/m² were placed in a speaker cone making mold and shaped at a temperature of 180° C. and a pressure of 2 kg/cm² for 6 seconds to produce a number of speaker cones.

At the inside surface and the outside surface of the resultant speaker cones there were observed opaque portions formed by the melting and resinification of divided fine fibers. The undivided acrylic synthetic fibers present inside were compressed together, but no fused portions could be observed. Further, no deformation, damage, or other abnormality of the sheets at the time of shaping could be observed, and the shapeability was extremely excellent. The variation in weight among speaker cones was within ±5%.

Table 1 shows the characteristics of the speaker cones (No. 1 to 3).

Further, electron micrographs of the inside surface, outside surface, and cross-section of the No. 1 speaker cone are respectively shown in FIG. 3 (235X), FIG. 4 (234X), and FIG. 5 (177X).

As understood from Table 1, the speaker cones were close to the speaker cones produced from natural wood pulp (see Comparative Example 1) in the internal loss (tanδ), but were improved in the sonic speed.

TABLE 1

|  | Density (gm/cm³) | Young's modulus (dyne/cm²) | Sonic velocity (m/s) | tanδ |
| --- | --- | --- | --- | --- |
| No. 1 | 0.585 | 0.952 × 10¹⁰ | 1,210 | 0.045 |
| No. 2 | 0.588 | 1.010 × 10¹⁰ | 1,310 | 0.058 |
| No. 3 | 0.568 | 0.897 × 10¹⁰ | 1,260 | 0.050 |
| Average | 0.580 | 0.921 × 10¹⁰ | 1,260 | 0.051 |

EXAMPLE 2

A number of speaker cones was produced in the same way as in Example 1 except that the shaping pressure was made 5 kg/cm².

The speaker cones obtained were not any different in appearance from the speaker cones of Example 1 except that at the inside surface and outside surface there were clearly observed semitransparent portions formed by the melting and resinification of the fibers. Further, no deformation, damage, or other abnormality was observed at the time of shaping and the shapeability was extremely good. The variation in weight among the speaker cones was within ±5 %.

Table 2 shows the characteristics of the speaker cones (No. 4 to 6) of Example 2.

TABLE 2

|  | Density (gm/cm³) | Young's modulus (dyne/cm²) | Sonic velocity (m/s) | tanδ |
| --- | --- | --- | --- | --- |
| No. 4 | 0.556 | 0.719 × 10¹⁰ | 1,140 | 0.051 |
| No. 5 | 0.571 | 0.714 × 10¹⁰ | 1,120 | 0.045 |
| No. 6 | 0.563 | 0.731 × 10¹⁰ | 1,140 | 0.047 |
| Average | 0.563 | 0.721 × 10¹⁰ | 1,133 | 0.048 |

EXAMPLE 3

The entire surfaces of No. 1 speaker cones produced in Example 1 were coated with a modified silica resin solution containing 20% by weight solids, sold by Lonchemical Co. under the brandname 100H Clear, then was naturally dried to produce speaker cones containing ceramic.

The variation in weight among speaker cones was within ±5%.

Table 3 shows the characteristics of the speaker cones (No. 7 to 9).

TABLE 3

|  | Density (gm/cm³) | Young's modulus (dyne/cm²) | Sonic velocity (m/s) | tanδ |
| --- | --- | --- | --- | --- |
| No. 7 | 0.660 | 1.140 × 10¹⁰ | 1,310 | 0.049 |
| No. 8 | 0.677 | 1.290 × 10¹⁰ | 1,380 | 0.049 |
| No. 9 | 0.642 | 1.230 × 10¹⁰ | 1,390 | 0.046 |
| Average | 0.659 | 1.220 × 10¹⁰ | 1,360 | 0.048 |

EXAMPLE 4

Sheets (A) of "METSUKE" of 120 g/m² were shaped under similar conditions as Example 1 to produce speaker cones.

At the inside surface and outside surface of the obtained speaker cones, there were observed opaque portions formed by the fusing and resinification of the fibers. The inside fibers were compressed together, but no fused portions could be observed. Further, no deformation, damage, or other abnormality at the time of shaping was observed and the shapeability was extremely good.

The shapes of the inside surface, outside surface, and cross-section of the speaker cones obtained were the same as those of the No. 1 speaker cones in Example 1.

Aluminum foil of a thickness of 50 μm was laminated by an adhesive on the speaker cones to produce a number of speaker cones. The variation in weight among the obtained speaker cones was within ±5%.

Table 4 shows the characteristics of the speaker cones (No. 10 to 12).

As will be understood from Table 4, the speaker cones were improved very much in the sonic velocity and Young's modulus by the lamination of the aluminum foil, but the internal loss (tanδ) did not change much at all by the processing and was the same as with speaker cones comprised of natural wood pulp.

TABLE 4

|  | Density (gm/cm³) | Young's modulus (dyne/cm²) | Sonic velocity (m/s) | tanδ |
| --- | --- | --- | --- | --- |
| No. 10 | 0.789 | $2.190 \times 10^{10}$ | 1,670 | 0.040 |
| No. 11 | 0.788 | $2.410 \times 10^{10}$ | 1,750 | 0.041 |
| No. 12 | 0.790 | $2.230 \times 10^{10}$ | 1,720 | 0.040 |
| Average | 0.789 | $2.310 \times 10^{10}$ | 1,713 | 0.040 |

EXAMPLE 5

A three-layer laminate comprised of sheets (A) of "METSUKE" of 100 g/m² sandwiching a nonwoven fabric of "METSUKE" of 40 g/m² comprised of 0.5 denier polypropylene fibers was placed in a speaker cone making mold and shaped at a temperature of 150° C. and a pressure of 2 kg/cm² for 5 seconds to produce a number of speaker cones.

FIG. 8 and FIG. 9 are electron micrographs (236X, 234X) showing the state of the inside surface and the outside surface.

FIG. 10 is an electron micrograph (177XX) showing the sectional state of the above-mentioned speaker cones. In FIG. 10, the top surface corresponds to the inside surface of the speaker cone, while the bottom surface corresponds to the outside surface. At the inside of the speaker cone in the thickness direction there are undivided acrylic synthetic fibers, which undivided acrylic synthetic fibers entangle with each other and entangle with the divided fine fibers as well. The undivided acrylic synthetic fibers at the inside in the thickness direction and the divided fine fibers are in close contact. That is, even after shaped to speaker cones, there are acrylic synthetic fibers of a structure no different from before the shaping and having a large number of long and narrow voids extending in the length direction. Further, the polypropylene fibers melt and act as an adhesive. Therefore, the strength of the speaker cones is greatly improved, the handling ability is improved, and a strength is imparted sufficient to withstand use in high temperature, high humidity environments such as automobiles and outdoors.

Further, no deformation, damage, or other abnormality of the laminate was observed and the shapeability was extremely excellent.

The variation in weight among the speaker cones and the variation in the adhesion of melted pieces of polypropylene were respectively within ±4% and ±3%.

Table 5 shows the characteristics of the speaker cones (No. 13 to 15).

TABLE 5

|  | Density (gm/cm³) | Young's modulus (dyne/cm²) | Sonic velocity (m/s) | tanδ |
| --- | --- | --- | --- | --- |
| No. 13 | 0.582 | $0.999 \times 10^{10}$ | 1,310 | 0.051 |
| No. 14 | 0.575 | $1.048 \times 10^{10}$ | 1,350 | 0.055 |
| No. 15 | 0.585 | $0.973 \times 10^{10}$ | 1,290 | 0.059 |
| Average | 0.580 | $1.006 \times 10^{10}$ | 1,316 | 0.055 |

EXAMPLE 6

Similar resin treatment as in Example 3 was performed on the No. 13 speaker cones produced in Example to produce speaker cones containing ceramic. The variation in weight among the speaker cones was within ±4%.

Table 6 shows the characteristics of the speaker cones (No. 16 to 18).

As will be understood from Table 6, the speaker cones are improved in the Young's modulus and sonic velocity without change of the internal loss (tanδ).

TABLE 6

|  | Density (gm/cm³) | Young's modulus (dyne/cm²) | Sonic velocity (m/s) | tanδ |
| --- | --- | --- | --- | --- |
| No. 16 | 0.669 | $1.330 \times 10^{10}$ | 1,410 | 0.051 |
| No. 17 | 0.663 | $1.280 \times 10^{10}$ | 1,390 | 0.050 |
| No. 18 | 0.667 | $1.364 \times 10^{10}$ | 1,430 | 0.054 |
| Average | 0.666 | $1.324 \times 10^{10}$ | 1,410 | 0.052 |

EXAMPLE 7

Aluminum foil of a thickness of 50 μm was laminated using an adhesive on the No. 13 speaker cones produced in Example 5 to produce a number of speaker cones. The variation in weight of the obtained speaker cones was within ±4%.

Table 7 shows the characteristics of the speaker cones (No. 19 to 21).

As will be understood from Table 7, the speaker cones are extremely improved in the sonic velocity and Young's modulus by the lamination of the aluminum foil, but the internal loss (tanδ) does not change much at all compared with speaker cones comprised of natural wood pulp.

TABLE 7

|  | Density (gm/cm³) | Young's modulus (dyne/cm²) | Sonic velocity (m/s) | tanδ |
| --- | --- | --- | --- | --- |
| No. 19 | 0.792 | $2.453 \times 10^{10}$ | 1,760 | 0.045 |
| No. 20 | 0.795 | $2.270 \times 10^{10}$ | 1,690 | 0.046 |
| No. 21 | 0.785 | $2.377 \times 10^{10}$ | 1,740 | 0.041 |
| Average | 0.790 | $2.366 \times 10^{10}$ | 1,730 | 0.044 |

EXAMPLE 8

A three-layer laminate comprised of sheets (A) of "METSUKE" of 100 g/m² sandwiching a nonwoven fabric of "METSUKE" of 50 g/m² comprised of carbon fibers was placed in a speaker cone making mold and shaped at a temperature of 180° C. and a pressure of 2 kg/cm² for 5 seconds to produce a number of speaker cones. No deformation, damage, or other abnormality of the laminate was observed and the shapeability was extremely excellent.

The fiber layer comprised of carbon fibers present inside the speaker cone was firmly affixed between the sheets (A).

The variation in weight among the speaker cones was within ±4%.

Table 8 shows the characteristics of the speaker cones (No. 22 to 24).

As will be understood from Table 8, the speaker cones changed slightly in internal loss (tanδ), but were considerably improved in the Young's modulus and sonic velocity.

TABLE 8

|        | Density (gm/cm³) | Young's modulus (dyne/cm²) | Sonic velocity (m/s) | tanδ  |
|--------|------------------|----------------------------|----------------------|-------|
| No. 22 | 0.575            | $3.175 \times 10^{10}$     | 2,350                | 0.058 |
| No. 23 | 0.568            | $2.749 \times 10^{10}$     | 2,200                | 0.055 |
| No. 24 | 0.561            | $3.258 \times 10^{10}$     | 2,410                | 0.043 |
| Average| 0.568            | $3.060 \times 10^{10}$     | 2,320                | 0.052 |

EXAMPLE 9

Similar resin treatment as in Example 3 was performed on the No. 22 speaker cones produced in Example to produce speaker cones containing ceramic. The variation in weight among the speaker cones was within Table 9 shows the characteristics of the speaker cones (No. 25 to 27).

As will be understood from Table 9, the speaker cones are extremely improved in the sonic velocity and Young's modulus by the resin treatment, but the internal loss (tanδ) slightly changes and is similar to that of speaker cones comprised of natural pulp.

TABLE 9

|        | Density (gm/cm³) | Young's modulus (dyne/cm²) | Sonic velocity (m/s) | tanδ  |
|--------|------------------|----------------------------|----------------------|-------|
| No. 25 | 0.640            | $4.460 \times 10^{10}$     | 2,640                | 0.047 |
| No. 26 | 0.649            | $3.991 \times 10^{10}$     | 2,480                | 0.046 |
| No. 27 | 0.645            | $4.326 \times 10^{10}$     | 2,590                | 0.046 |
| Average| 0.645            | $4.259 \times 10^{10}$     | 2,570                | 0.046 |

EXAMPLE 10

Aluminum foil of a thickness of 50 μm was laminated using an adhesive on the No. 22 speaker cones produced in Example 8 to produce a number of speaker cones. The variation in weight of the obtained speaker cones was within ±4%.

Table 10 shows the characteristics of the speaker cones (No. 28 to 30).

As will be understood from Table 10, the speaker cones are extremely improved in the sonic velocity and Young's modulus by the lamination of the aluminum foil, but the internal loss (tanδ) does not change much at all by this processing and is the same as with speaker cones comprised of natural pulp.

TABLE 10

|        | Density (gm/cm³) | Young's modulus (dyne/cm²) | Sonic velocity (m/s) | tanδ  |
|--------|------------------|----------------------------|----------------------|-------|
| No. 28 | 0.786            | $7.553 \times 10^{10}$     | 3,100                | 0.040 |
| No. 29 | 0.778            | $6.770 \times 10^{10}$     | 2,950                | 0.039 |
| No. 30 | 0.775            | $7.068 \times 10^{10}$     | 3,020                | 0.042 |
| Average| 0.779            | $7.130 \times 10^{10}$     | 3,023                | 0.040 |

Comparative Example 1

A speaker cone was produced in the following manner from natural pulp.

Pulp material was swelled, then subjected to digestion, beating, and other processes to prepare the stock. To the stock was added a rosin resin sold by Kindai Kagaku Kogyo under the brandname Pelloser WS. This was adjusted in pH and adjusted in concentration, then made into a speaker cone shape by a wire screen, drained of water, and pressed to form the slanted portion of the speaker cones. This slanted portion was cut, then finished to produce a number of speaker cones.

The variation in weight of the speaker cones was ±10%.

Table 11 shows the characteristics of an example of these speaker cones (No. 31).

TABLE 11

|        | Density (gm/cm³) | Young's modulus (dyne/cm²) | Sonic velocity (m/s) | tanδ  |
|--------|------------------|----------------------------|----------------------|-------|
| No. 31 | 0.810            | $0.980 \times 10^{10}$     | 1,100                | 0.040 |

Comparative Example 2

The acrylic synthetic fibers for producing the sheet (A) were cut into 15 mm lengths. Ten parts by weight of the fibers were dispersed in 90 parts by weight of water. Next, the fibers dispersed in water were beaten until a freeness of 450 cc by a papermaking disk refiner with a disk interval adjusted to 0.1 mm to thereby produce an acrylic synthetic pulp fiber.

This pulp had numerous fine whisker-like fibers branched from the trunks at the surface of the thick fiber portions (original trunks of the acrylic synthetic fibers). Further, the fibers serving as the trunks were divided into fine fibers in the longitudinal direction. Ninety parts of the acrylic synthetic pulp fiber and 10 parts of natural wood pulp (N-BKP) were dispersed in water and subjected to a usual papermaking process to make paper, then this was dried by hot air of 85° C. to prepare a 300 g/m² sheet like article.

In the production process, the dispersability of the acrylic synthetic pulp fibers in water was poor, clumps of fibers frequently occurred, and it was not possible to produce a uniform sheet. Therefore, there were numerous spots of clumps of fibers on the resultant sheet shaped article.

When the sheet shaped article was formed into a speaker cone under conditions of 6 kg/cm², 120° C., and 3 seconds, the shape of the speaker cone could be retained to a certain extent, but breaks occurred in the sheet shaped article at the bent portions of the article and it was not possible to measure the audio characteristics.

As will be understood from the effects of the above examples and comparative examples, in the speaker cones of the present invention, the variation in the weight in the speaker cones produced under the same conditions was within ±5%. Therefore, it is possible to more than halve the value compared with Comparative Example 1 obtained from natural pulp (±10%).

Further, if the speaker cone produced from the conventional natural pulp is laminated with aluminum foil, the value of the tanδ expressing the internal loss changes as much as one order of magnitude, but in the speaker cone of the present invention, as will be understood from Example 4 and Example 10, it is possible to raise the sonic velocity and the Young's modulus without changing the value of the tanδ that much.

Further, as will be understood from Comparative Example 2, when processing the acrylic synthetic fibers of the present invention into a pulp form, it is more difficult to produce a sheet shaped article than even when using the conventional natural pulp as a stock. It is not possible to produce a speaker cone.

As explained above, the speaker cone of the present invention is formed by a sheet (A) of a special construction formed by acrylic synthetic fibers of a special structure. Since there are fused portions of the fibers on at least one surface of the same, the shape retention is better than with that of a sheet obtained by the papermaking process.

Therefore, it becomes possible to produce a speaker cone without performing a papermaking process. The work environment of the speaker cone production floor is significantly improved and the generation of waste can be suppressed. Further, it is possible to reduce the unevenness of the thickness of speaker cones and the variation in weight among products, so it is possible to provide speaker cones of a stable quality.

The speaker cone comprised of natural wood pulp cannot be avoided from the variation in audio characteristics due to the stock and further from the deterioration in the audio characteristics and the changes in the shape due to the humidity.

However, the speaker cone according to the present invention has no variation in the audio characteristics due to the stock thereof and is not affected by the humidity and temperature. For this reason, the present speaker cone can sufficiently withstand against the use in a severe environment (e.g., outdoors, insides of automobiles) where humidity and temperature are vigorously changed.

Further, it is possible to form speaker cones by sandwiching a heat-fusible fiber sheet, that is, a sheet (B) comprised of carbon fibers or other fibers, between the sheets (A). Therefore, by suitably selecting the types of the fibers forming the sheet (B), it is possible to easily obtain speaker cones having special features of strength, audio characteristics, etc.

Still further, when using a plastic film as the stock in the prior art, complicated processes like plasma treatment, flame treatment, and primary coating were necessary after the shaping, but this treatment is not required in the speaker cone of the present invention.

In addition, the speaker cone of the present invention does not change much at all in internal loss (tanδ) among its audio characteristics due to changes in the manufacturing conditions, resin treatment, lamination by metallic foil, etc., so there is also the effect that by changing the manufacturing conditions and processing conditions, it is possible to change the sonic velocity and other characteristics with a good balance.

We claim:

1. A speaker cone comprising a sheet (A) in the shape of a cone, said sheet (A) being comprised of acrylic synthetic fibers having long and narrow voids extending internally along the longitudinal direction, said voids having nonspecific lateral cross-sectional shapes, at least 70% by weight of the acrylic synthetic fibers present at the surface of the sheet (A) being divided into fine fibers, at least 70% by weight of undivided acrylic synthetic fibers being present in the inside of the sheet (A), all fibers being made integral through mutual entanglement, wherein at least one of the surfaces of the cone shaped article has fused portions of the fibers.

2. A speaker cone comprising a laminate, in the shape of a cone, of a sheet (A) comprised of acrylic synthetic fibers and a fibrous sheet (B) comprised of heat fusible fibers or fibers having high strength and a high Young's modulus, or fibers for improving audio characteristics, said sheet (A) comprised of acrylic synthetic fibers having long and narrow voids extending internally along the longitudinal direction, said voids having a nonspecific lateral cross-sectional shape, at least 70% by weight of the fibers present at the surface of the sheet (A) being divided into fine fibers, at least 70% by weight of undivided acrylic synthetic fibers being present in the inside of the sheet (A), all fibers being made integral through mutual entanglement, said sheet (B) fusible fibers are polyethylene fibers, polypropylene fibers, polyamide fibers, polyester fibers, polyvinyl alcohol fibers, polyvinyl chloride fibers, or polyvinylidene chloride fibers; and said high strength, and high Young's modulus fibers, and fibers having improved audio characteristics are carbon fibers, glass fibers, mineral fibers, aromatic polyamide fibers, aromatic polyester fibers or cellulose fibers.

3. The speaker cone of claim 1 further including 10% by weight of added fibers where said added fibers are natural wood pulp fibers, carbon fibers, aromatic polyamide fibers or mineral fibers.

4. The speaker cone of claim 2 comprising a laminate of said sheet (A), said sheet (B), and said sheet (A).

5. The speaker cone of claim 2 wherein said sheet (B) is made of polypropylene fibers.

6. The speaker cone of claim 2 wherein said sheet (B) is made of carbon fibers.

7. The speaker cone of claim 3 wherein a metal layer is laminated to said cone.

8. The speaker cone of claim 4 wherein a metal layer is laminated to said cone.

9. The speaker cone of claim 5 wherein a metal layer is laminated to said cone.

10. The speaker cone of claim 6 wherein a metal layer is laminated to said cone.

* * * * *

UNITED STATES PATENT AND TRADEMARK OFFICE
CERTIFICATE OF CORRECTION

PATENT NO. : 5,458,958
DATED : October 17, 1995
INVENTOR(S) : Kanzaki et al.

It is certified that error appears in the above-indentified patent and that said Letters Patent is hereby corrected as shown below:

<u>On the title page:</u>

Col. 1, after "Assignee: Asahi Kasei Kogyo Kabushiki Kaisha", insert --Saiga Denki Seisakusho Co., Ltd., both of--.

Claim 5, col. 22, line 38, change "claim 2" to --claim 2 or claim 4--;

Claim 6, col. 22, line 40, change "claim 2" to --claim 2 or claim 4--;

Claim 8, col. 22, line 44, change "claim 4" to --claim 2 or claim 4--.

Signed and Sealed this

Sixteenth Day of January, 1996

Attest:

BRUCE LEHMAN

*Attesting Officer*　　*Commissioner of Patents and Trademarks*